(12) United States Patent
Weitzel

(10) Patent No.: US 6,664,322 B2
(45) Date of Patent: Dec. 16, 2003

(54) PROCESS FOR PREPARING PROTECTIVE-COLLOID-STABILIZED POLYMERS BY CONTINUOUS EMULSION POLYMERIZATION

(75) Inventor: Hans-Peter Weitzel, Reischach (DE)

(73) Assignee: Wacker-Chemie GmbH, Munich (DE)

( * ) Notice: Subject to any disclaimer, the term of this patent is extended or adjusted under 35 U.S.C. 154(b) by 305 days.

(21) Appl. No.: 09/891,561

(22) Filed: Jun. 26, 2001

(65) Prior Publication Data

US 2002/0035192 A1 Mar. 21, 2002

(30) Foreign Application Priority Data

Jul. 21, 2000 (DE) .......................................... 100 35 587

(51) Int. Cl.$^7$ .................................................. C08F 2/16
(52) U.S. Cl. ...................... 524/459; 526/65; 526/317.1; 526/319; 526/330; 526/348
(58) Field of Search ............................ 524/459; 526/65, 526/317.1, 319, 330, 348

(56) References Cited

U.S. PATENT DOCUMENTS

| | | | |
|---|---|---|---|
| 2,703,794 A | | 3/1955 | Roedel et al. |
| 3,532,658 A | | 10/1970 | Gintz et al. |
| 3,551,396 A | | 12/1970 | Lanthier et al. |
| 4,035,329 A | | 7/1977 | Wiest et al. |
| 4,164,489 A | | 8/1979 | Daniels et al. |
| 4,331,577 A | * | 5/1982 | Hanna .................... 524/819 |
| 4,847,339 A | * | 7/1989 | Heimberg et al. .......... 526/80 |
| 5,331,055 A | * | 7/1994 | Fujiwara et al. .......... 526/80 |
| 5,633,334 A | | 5/1997 | Walker et al. |
| 5,939,505 A | | 8/1999 | Kukkala |

FOREIGN PATENT DOCUMENTS

| | | |
|---|---|---|
| DE | 25 55 142 | 6/1976 |
| DE | 24 56 576 | 8/1976 |
| DE | 44 19 518 A1 | 12/1995 |
| EP | 0 924 229 A1 | 6/1999 |
| EP | 1 067 147 A2 | 1/2001 |

OTHER PUBLICATIONS

Derwent Abstract corresponding to DE 25 55 142 [AN 1976–48015X].
Derwent Abstract corresponding to DE 24 56 576 [AN 1976–44051X].
Petrocelli et al., Polym. Sci. Eng., 80, 544–545 (1999).
Fox, T.G., Bull. Am. Physics Soc., 1, 3, p. 123 (1956).
Polymer Handbook, 2nd Edition, J. Wiley & Sons, New York (1975).
Derwent Abstract Corresponding To DE 44 19 518 [AN 1996—021300].
Chemical Abstract 1972, vol. 77, No. 2 Corresponding To JP 72,01,773.
Chemical Abstract 1983, vol. 98, No. 18 Corresponding To JP 57,177,009.
Petrocelli, F.P. et al, "Continuous Process for the Production of Vinyl Acetate–Ethylene Emulsion Copolymers", Macromolecular Symposia, Wiley, Weinheim, 04/00, pp. 39–51.

\* cited by examiner

Primary Examiner—Helen L. Pezzuto
(74) Attorney, Agent, or Firm—Brooks Kushman P.C.

(57) ABSTRACT

A process for preparing polyvinyl-alcohol-stabilized polymers based on vinyl ester, ethylene, and optionally other comonomers, in the form of aqueous polymer dispersions or water-redispersible polymer powders, by means of free radical initiated continuous emulsion polymerization and optionally drying the resultant polymer dispersion, comprising carrying out the emulsion polymerization in minimally two pressurized reactors arranged in series at a temperature of from 40° C. to 100° C. and at a pressure of from 5 to 100 bar, to a residual monomer content less than 3% by weight, and continuing the polymerization in minimally one unpressurized reactor at a temperature of from 20° C. to 60° C. and at a pressure of less than 1.0 bar, wherein the polymerization is initiated using a redox system made from an oxidizing component and a reducing component, at least a portion of the reducing component introduced within the first pressurized reactor.

20 Claims, No Drawings

PROCESS FOR PREPARING PROTECTIVE-COLLOID-STABILIZED POLYMERS BY CONTINUOUS EMULSION POLYMERIZATION

BACKGROUND OF THE INVENTION

1. Field of the Invention

The invention relates to a process for preparing protective-colloid-stabilized polymers based on vinyl esters and ethylene and, optionally other comonomers, in the form of aqueous polymer dispersions or water-redispersible polymer powders, by means of continuous emulsion polymerization and, when appropriate, drying the resultant polymer dispersion.

2. Background Art

Protective-colloid-stabilized polymers are used in a wide variety of applications, especially in the form of their aqueous dispersions or water-redispersible polymer powders prepared therefrom. Applications include, for example coating compositions and adhesives for use with a very great variety of substrates. The protective colloids employed are generally polyvinyl alcohols. The use of polyvinyl alcohol is desirable since this material contributes to the strength characteristics of the polymer (i.e. tensile bond strengths of tile adhesives), as opposed to polymer systems stabilized by low-molecular-weight compounds (emulsifiers). The monomers preferably used for preparing redispersible powders have hitherto been vinyl esters and ethylene, since it is difficult to effect stabilization of acrylate copolymers or styrene-acrylate copolymers when employing polyvinyl alcohol.

Dispersions have traditionally been prepared by batch emulsion polymerization. This procedure has high flexibility and is therefore preferred in manufacturing facilities producing a wide range of products. In addition, this procedure is much less technically demanding than continuous processes. However, a disadvantage of batch processes as compared with continuous processes is the much lower cost-effectiveness of the former.

A continuous process is therefore the preferred choice for plants producing large quantities of a narrow range of products. The principle problem with continuous emulsion polymerization is establishing the proper conditions for constant nucleation of new latex particles. The favored plant configuration is a stirred tank cascade, since reactors of this type are commonly used in batch operations and could therefore be used in the continuous processes with only low conversion costs. The product properties and the process parameters often exhibit considerable variation, and in extreme cases these can be the cause of unusable product or even damage to the plant.

U.S. Pat. No. 2,703,794 describes a process for the continuous emulsion polymerization of vinyl acetate and ethylene in the presence of an emulsifier and, where appropriate, water-miscible organic solvent, with continuous and simultaneous feed of water, emulsifier, monomers, and initiator. The process is carried out without any seed latex, in but a single pressurized reactor. Disadvantages of this process are heavy reactor wall deposits and oscillation in particle size.

U.S. Pat. No. 3,551,396 describes a process for preparing vinyl acetate homopolymer dispersions in a loop reactor, in which monomer and water are continuously circulated, with continuous feed of additional monomer and initiator, the polymer formed being continuously removed from the reactor. The polymerization is carried out without any seed latex, and again, in a single pressurized reactor.

DE-A 2555142 describes a continuous process for the preparation of polymers of ethylenically unsaturated monomers by emulsion polymerization in a plurality of polymerization reactors arranged in series. In this process, a first reactor is supplied with a "preemulsion" made from water, initiator, part of the monomers, and other auxiliaries, and the resultant dispersion is transferred into a second reaction vessel. The remainder of the monomers is then introduced, and the polymerization of the dispersion is completed in a final reaction vessel, by supplying additional initiator.

DE-A 2456576 describes a plant configuration composed of a tank reactor for the main polymerization and a tubular reactor for postpolymerization. The polymerization is carried out in the presence of a redox initiator system, using a large excess of reducing agent. The monomers feed rate is adjusted so that their concentration does not exceed a defined limit. A disadvantage of this process is the rapid formation of wall deposits, leading to frequent shutdown, due in part to marked variations in the properties of the products.

U.S. Pat. No. 4,164,489 describes a process for the continuous preparation of vinyl acetate-ethylene dispersions employing a seed latex which is also introduced continuously. A disadvantage is that this seed latex represents a separate product which must to be specifically prepared for this purpose due to its low particle size, about 200 nm. As a result, undesirable components employed in seed preparation, the mixing specification, for example emulsifiers, are carried over into the product.

A process employing a seed latex is described by Petrocelli et al., POLYM. SCI. ENG., 80, 544. Here, too, use is made of a fine-particle size emulsifier-stabilized dispersion, one having a particle size of about 200 nm. The theoretical basis for this seed latex process involves the introduction of new, very small latex particles which then grow in the course of the polymerization to give the desired particle size. The seed latex is intended to suppress any new internal nucleation.

When redispersible polymer powders are employed to improve mortar properties, a principle market for redispersible powders, the mixing proportions must remain stable for extended periods of time, and there must also be no substantial change in the working consistency, for example viscosity and cement stability of the products when mixed. In the concrete and mortar industry, mechanical properties are especially important, for example compressive strength, porosity, and thus air-pore content. In addition, hydraulically setting systems which are to be improved by adding dispersion powders should provide better adhesion than systems without such addition. All of these product properties must be reliably provided when batch processes for preparing redispersible polymers are replaced by continuous processes, which has not heretofore been possible.

SUMMARY OF THE INVENTION

It was an object of the present invention to develop a cost-effective and technologically improved process for the continuous preparation of vinyl ester-ethylene copolymer dispersions. Problems addressed by the present invention include those which are involved with the end use of the desired products as well as those involved with their preparation. For example, the products are eminently suitable for use in tile mortar, hydraulically setting systems, and other cementitious products while maintaining or improving upon the properties of dispersible powders produced by batch processes.

It has now been surprisingly discovered that the use of a seed latex which, at least in terms of particle size, corresponds to the end product of the process, or else without using any seed latex, results in a stable continuous process for the preparation of emulsion polymers. The use of the product itself as the seed latex contradicts conventional wisdom that the stability of the process should be controlled via ordered particle growth, since the particles introduced already have the desired ultimate size, and would be expected to grow further under the reaction conditions. To the contrary, however, a stable condition is observed, without oscillation of particle size or of other product properties.

DETAILED DESCRIPTION OF THE PREFERRED EMBODIMENT(S)

The invention provides a process for preparing polyvinyl-alcohol-stabilized polymers based on vinyl esters and ethylene and optionally other comonomers, in the form of aqueous polymer dispersions or water-redispersible polymer powders, by means of free radical initiated continuous emulsion polymerization and, where appropriate, drying the resultant polymer dispersion.

The process comprises the steps of:
a) conducting an emulsion polymerization in at least two pressurized reactors arranged in series, at a temperature of from 40° C. to 100° C. and at a pressure of from 5 bar to 100 bar, to a residual monomer content of less than 3% by weight, and then continuing the polymerization in at least one unpressurized reactor at a temperature of from 20° C. to 60° C. and at a pressure of less than 1 bar, wherein
b) the polymerization is initiated using a redox system comprising an oxidizing component and a reducing component, where at least a portion of the reducing component is introduced into the first pressurized reactor.

Suitable vinyl esters are those of carboxylic acids having from 1 to 12 carbon atoms. Preferred vinyl esters are vinyl acetate, vinyl propionate, vinyl butyrate, vinyl 2-ethylhexanoate, vinyl laurate, 1-methylvinyl acetate, vinyl pivalate, and vinyl esters of α-branched monocarboxylic acids having from 9 to 11 carbon atoms, for example VeoVa9® or VeoVa10® (trade names of Shell). Vinyl acetate is particularly preferred. The amount of vinyl ester generally copolymerized is from 30 to 90% by weight, based on the total weight of the monomers. Mixtures of monomers is contemplated.

The amount of ethylene generally copolymerized is from 1 to 40% by weight, based on the total weight of the monomers.

Suitable optional comonomers include the esters of acrylic acid or methacrylic acid, vinyl halides, such as vinyl chloride, and olefins such as propylene. Suitable methacrylic esters or acrylic esters include esters of unbranched or branched alcohols having from 1 to 15 carbon atoms, for example methyl acrylate, methyl methacrylate, ethyl acrylate, ethyl methacrylate, propyl acrylate, propyl methacrylate, n-butyl acrylate, n-butyl methacrylate, 2-ethylhexyl acrylate, and norbornyl acrylate. Preference is given to methyl acrylate, methyl methacrylate, n-butyl acrylate, and 2-ethylhexyl acrylate. When used, the amount of the comonomers copolymerized is preferably from 1 to 40% by weight, based on the total weight of the monomers.

Optionally, from 0.05 to 10% by weight, based on the total weight of the monomer mixture, or auxiliary monomers may also be copolymerized. Examples of auxiliary monomers are ethylenically unsaturated mono- and dicarboxylic acids, preferably acrylic acid, methacrylic acid, fumaric acid and maleic acid; ethylenically unsaturated carboxamides and ethylenically unsaturated carbonitriles, preferably acrylamide and acrylonitrile; mono- and diesters of fumaric acid or maleic acid, such as the diethyl and diisopropyl esters; maleic anhydride; and ethylenically unsaturated sulfonic acids and their salts, preferably vinylsulfonic acid and 2-acrylamido-2-methylpropanesulfonic acid. Other examples are precrosslinking comonomers, for example ethylenically polyunsaturated comonomers such as divinyl adipate, diallyl maleate, allyl methacrylate, and triallyl cyanurate; and postcrosslinking comonomers such as acrylamidoglycolic acid (AGA), methyl methylacrylamidoglycolate (MAGME), N-methylolacrylamide (NMA), N-methylolmethacrylamide (NMMA), allyl N-methylolcarbamate, alkyl ethers or esters such as the isobutoxy ethers or esters of N-methylolacrylamide, N-methylolmethacrylamide, or allyl N-methylolcarbamate. Other suitable comonomers are epoxy-functional comonomers such as glycidyl methacrylate and glycidyl acrylate, and further examples are silicon-functional comonomers such as acryloxypropyltri(alkoxy)- and methacryloxypropyltri(alkoxy)silanes, vinyltrialkoxysilanes, and vinylmethyldialkoxysilanes, examples of the alkoxy groups of which are methoxy, ethoxy, and ethoxypropylene glycol ether radicals. Mention may also be made of monomers bearing hydroxyl or CO groups, for example hydroxyalkyl methacrylates and hydroxyalkyl acrylates such as hydroxyethyl, hydroxypropyl, or hydroxybutyl acrylate and the corresponding methacrylates, and also compounds such as diacetone acrylamide and acetylacetoxyethyl(meth)acrylate.

Preference is given to comonomer mixtures of vinyl acetate with from 1 to 40% by weight of ethylene; comonomer mixtures of vinyl acetate with from 1 to 40% by weight of ethylene and with from 1 to 50% by weight of one or more other comonomers selected from the group consisting of vinyl esters having from 1 to 12 carbon atoms in the carboxylic acid residue, e.g. vinyl propionate, vinyl laurate, and vinyl esters of alpha-branched carboxylic acids having from 9 to 11 carbon atoms such as VeoVa9, VeoVa10, and VeoVa11; mixtures of vinyl acetate with from 1 to 40% by weight of ethylene, and preferably from 1 to 60% by weight of acrylic esters of unbranched or of branched alcohols having from 1 to 15 carbon atoms, in particular n-butyl acrylate or 2-ethylhexyl acrylate; mixtures with from 30 to 75% by weight of vinyl acetate, from 1 to 30% by weight of vinyl laurate or vinyl esters of an alpha-branched carboxylic acid having from 9 to 11 carbon atoms, and also from 1 to 30% by weight of acrylic esters of unbranched or branched alcohols having from 1 to 15 carbon atoms, in particular n-butyl acrylate or 2-ethylhexyl acrylate, which also contain from 1 to 40% by weight of ethylene; and mixtures of vinyl acetate, from 1 to 40% by weight of ethylene, and from 1 to 60% by weight of vinyl chloride. The foregoing mixtures may also include auxiliary monomers, in the amounts previously described. The weight percentages of the various monomers will not, of course, exceed 100% in total.

The selection of the monomers and the proportions by weight of the comonomers is such that the resultant glass transition temperature ("Tg") is generally from −50 to +50° C. The Tg of the polymers may be determined in a known manner by differential scanning calorimetry (DSC). The Tg may also be approximated using the Fox equation. According to T. G. Fox, BULL. AM. PHYSICS SOC. 1, 3, page 123 (1956): $1/Tg = x_1/Tg_1 + x_2/Tg_2 + \ldots + x_n/Tg_n$, where $x_n$ is the proportion by weight (% by weight/100) of the monomer n and $Tg_n$ is the glass transition temperature in degrees Kelvin of the homopolymer of the monomer n. Tg values for homopolymers are listed in POLYMER HANDBOOK, 2nd Edition, J. Wiley & Sons, New York (1975).

Polymer preparation takes place by emulsion polymerization, the polymerization temperature generally being from 40° C. to 100° C., preferably from 60 to 90° C. The polymerization is initiated with the redox initiator combinations commonly used for emulsion polymerization. Examples of suitable oxidation initiators are the sodium, potassium, and ammonium salts of peroxydisulfuric acid, hydrogen peroxide, tert-butyl peroxide, tert-butyl hydroperoxide, potassium peroxydiphosphate, tert-butyl peroxypivalate, cumin hydroperoxide, isopropylbenzene monohydroperoxide, and azobisisobutyronitrile. Preference is given to the sodium, potassium, and ammonium salts of peroxydisulfuric acid, and hydrogen peroxide. The amount of the initiators generally used is from 0.01 to 2.0% by weight, based on the total weight of the monomers.

Suitable reducing agents are the sulfites and bisulfites of the alkali metals or of ammonium, for example sodium sulfite, the derivatives of sulfoxylic acid such as zinc formaldehyde sulfoxylate or alkali metal formaldehyde sulfoxylates such as sodium hydroxymethanesulfinate (Bruggolite), and (iso)ascorbic acid. Preference is given to sodium hydroxymethanesulfinate and (iso)ascorbic acid. The amount of reducing agent is preferably from 0.015 to 3% by weight, based on the total weight of the monomers.

To control the molecular weight, regulators, i.e. chain transfer agents, may be used during the polymerization. If such regulators are used, the amounts of these are usually from 0.01 to 5.0% by weight, based on the monomers to be polymerized. The regulators are usually metered separately or else premixed with other reaction components. Examples of regulators are n-dodecyl mercaptan, tert-dodecyl mercaptan, mercaptopropionic acid, methyl mercaptopropionate, isopropanol, and acetaldehyde. It is preferable not to use any regulators.

Suitable protective colloids are partially or completely hydrolyzed polyvinyl alcohols. Preference is given to partially hydrolyzed polyvinyl alcohols with a degree of hydrolysis of from 80 to 95 mol % and with a Höppler viscosity of from 1 to 30 mPa.s in 4% strength aqueous solution (Höppler method at 20° C., DIN 53015). Preference is also given to partially hydrolyzed hydrophobically modified polyvinyl alcohols with a degree of hydrolysis of from 80 to 95 mol % and with a Höppler viscosity of from 1 to 30 mPa.s in 4% strength aqueous solution. Examples of these are partially hydrolyzed copolymers of vinyl acetate with hydrophobic comonomers such as isopropenyl acetate, vinyl pivalate, vinyl ethylhexanoate, vinyl esters of saturated alpha-branched monocarboxylic acids having 5 or from 9 to 11 carbon atoms, dialkyl maleates and dialkyl fumarates such as diisopropyl maleate and diisopropyl fumarate, vinyl chloride, vinyl alkyl ethers such as vinyl butyl ether, and olefins such as ethene and decene. The proportion of the hydrophobic moieties is preferably from 0.1 to 10% by weight, based on the total weight of the partially hydrolyzed polyvinyl alcohol. It is also possible to use mixtures of the polyvinyl alcohols mentioned.

Other preferred polyvinyl alcohols are partially hydrolyzed hydrophobicized polyvinyl alcohols which have been obtained by a polymer-analogous reaction, such as acetalization of the vinyl alcohol units with $C_1$–$C_4$ aldehydes, such as butyraldehyde. The proportion of the hydrophobic units is preferably from 0.1 to 10% by weight, based on the total weight of the partially hydrolyzed polyvinyl acetate. The degree of hydrolysis is from 80 to 95 mol %, preferably from 85 to 94 mol %, and the Höppler viscosity (DIN 53015, Höppler method, 4% strength aqueous solution) is from 1 to 30 mPa.s, preferably from 2 to 25 mPa.s. Most preferably, polyvinyl alcohols with a degree of hydrolysis of from 85 to 94 mol % and with a Höppler viscosity of from 3 to 15 mPa.s in 4% strength aqueous solution (Höppler method at 20° C., DIN 53015) are used. The protective colloids mentioned are obtainable by conventional processes. The total amount of polyvinyl alcohols generally added during the polymerization is from 1 to 20% by weight based on the total weight of the monomers.

In the process of the invention it is preferable not to add emulsifiers to the polymerization. In exceptional cases it can be advantageous to make concomitant use of small amounts of emulsifiers, where appropriate from 1 to 5% by weight, based on the amount of monomer. Suitable emulsifiers are either anionic, cationic, or nonionic emulsifiers, for example anionic surfactants such as alkyl sulfates whose alkyl chain length is from 8 to 18 carbon atoms, alkyl or alkylaryl ether sulfates having from 8 to 18 carbon atoms in the hydrophobic radical and up to 40 ethylene oxide or propylene oxide units, alkyl- or alkylarylsulfonates having from 8 to 18 carbon atoms, esters and half-esters of sulfosuccinic acid with monohydric alcohols or alkylphenols, and nonionic surfactants such as alkyl polyglycol ethers or alkylaryl polyglycol ethers having from 8 to 40 ethylene oxide units.

The polymerization is carried out in at least two pressurized reactors arranged in series, and then is continued in at least one substantially unpressurized reactor. The pressurized reactors and unpressurized reactors used may be conventional steel reactors of appropriate dimensions with stirrers, heating/cooling systems, and lines for supplying the requisite starting materials and further lines, valves, etc., for discharging the products. A preferred configuration is composed of two pressurized reactors arranged in series and one or two subsequent unpressurized reactors. If two or more unpressurized reactors are used, these may be operated either in alternation (parallel) or in succession (series). Higher-level cascades with more than two pressurized reactors may be used, but are not always desirable since the complexity of the plant then increases.

The manner of conducting the process is such that in all of the pressurized reactors the total of the mass flows entering equals the total of the mass flows emerging. The unpressurized reactors are preferably operated alongside one another and utilized in alternation. The pressure of the respective series pressurized reactors is such that there is a falling pressure gradient from the first of the pressurized series reactors to the final pressurized reactor. This gradient reliably ensures that the proper mass flow takes place within the pressurized reactor cascade. Mass transport from the final pressurized reactor into the downstream unpressurized reactor may take place by way of pressure-regulated valves or by way of a pump, the quantity corresponding to the flow of materials introduced into the upstream pressurized reactors.

Before the start of the polymerization, from 50 to 80% of the volume of the pressurized reactors is filled with a polymer dispersion which corresponds to the final product of the polymerization with respect to copolymer makeup, the nature and amount of the protective colloid, and also the particle size and solids content. This dispersion may be prepared by way of batch polymerization in the pressurized reactors, or the pressurized reactors may be charged with a separately prepared dispersion.

The pressurized reactors are then supplied with an amount of ethylene such that polymerization preferably takes place at a pressure $P_1$ from 30 to 80 bar in the first pressurized reactor, and a pressure $P_2$ from 10 to 40 bar in the final pressurized reactor, with the proviso that $P_1$ is greater than $P_2$. The ethylene pressure is regulated so that there is a resultant falling pressure gradient from the first of the series pressurized reactors to the final pressurized reactor. The pressure difference between two adjacent pressurized reactors connected in series is preferably from 2 to 40 bar. This pressure difference between the pressurized reactors acts as the driving force for mass flow during the continuous polymerization process.

All of the monomers may be metered into the first pressurized reactor, or the monomer feed may be divided between the pressurized reactors. Preferably, that from 50 to 100% by weight, in particular more than 70% by weight, based on the total weight, of the vinyl ester monomers and, where appropriate, of other comonomers other than ethylene, are metered into the first pressurized reactor, and the remainder is metered into subsequent pressurized reactors. The initial charge in the first pressurized reactor comprises at least 50% by weight of the ethylene. The metering procedures may be carried out separately (in space and in time), or some or all of the components to be metered may be fed in the form of a preemulsion.

In addition to the other streams of starting materials, a seed latex may be introduced into the first pressurized reactor, the particle size Dw of this seed latex corresponding to that of the final product, that is to say that the particle size Dw of the latex is greater than 500 nm, preferably from 800 to 1200 nm. The seed latex should preferably also be a polyvinyl-alcohol-stabilized vinyl ester-ethylene dispersion. The seed latex is most preferably identical with the final product. Identical here means that the seed latex is identical with the final product of the polymerization with respect to copolymer makeup, the nature and amount of the protective colloid, and also the particle size and solids content. The seed latex may be prepared in a batch process. The preferred procedure is that the desired amount of the seed latex is reintroduced directly from the final unpressurized reactor, via a pump, into the first pressurized reactor. The amount of seed latex is from 0.1 to 8.0% by weight (solids/solids), based on the vinyl ester content. The amount of seed latex used is preferably that needed to suppress oscillation of the particle size and suppress wall deposit formation in the reactors, preferably from 0.1 to 3.0% by weight. The amount needed in any particular case depends on the makeup of monomers and, respectively, polymers, and on the protective colloid system selected. Surprisingly, it has also been found that the feed of seed can be entirely dispensed with once the polymerization has proceeded for a period which is preferably from 15 to 20 hours. The sole function of the seed in these circumstances is the more rapid achievement of a stable process condition. Particular preference is therefore given to a mode of operation in which the addition of seed latex is terminated 15 to 20 hours from the start of the polymerization.

The protective colloid may be introduced in its entirety as an initial charge in the first pressurized reactor, or else only a portion of the protective colloid may be part of initial charge in the first pressurized reactor and the remainder be metered in in subsequent pressurized reactors. It is preferable for at least 70% by weight of the protective colloid to be introduced with the initial charge in the first pressurized reactor, and is particularly preferable for all of the protective colloid to be part of the initial charge in the first pressurized reactor.

The polymerization is initiated with a redox system made from an oxidation component and a reduction component, all of the reduction component preferably being introduced into the first pressurized reactor, and the oxidation component being metered into all of the pressurized reactors. The metering of the initiator is used to control the conversion of monomers. The overall manner in which the initiators are metered in is such as reliably to provide continuous polymerization and such that the polymerization in the first pressurized reactor proceeds to a residual monomer content of from 10 to 20% by weight and that in the final pressurized reactor it proceeds to a residual monomer content of <3% by weight, based in each case on the total weight of the batch.

The preferred introduction of the reduction component exclusively within the first pressurized reactor leads to lower overall consumption of initiator, and to better mechanical properties in the films of the dispersions. The manner in which the overall metering rates of the starting materials are set is preferably such that the resultant average residence times in the pressurized reactor cascade total from 60 to 180 minutes.

After conclusion of the polymerization in the pressurized reactors, conventional methods are applied in the unpressurized reactor to remove residual monomers, generally via redox-catalyst-initiated postpolymerization. Both components of the initiator are therefore added within the unpressurized reactors, in the amounts needed for the finishing process. Volatile residual monomers may also be removed by distillation, preferably at reduced pressure, and, where appropriate, with a passage of inert carrier gases through or over the product, for example air, nitrogen, or steam.

The aqueous dispersions obtainable by the process of the invention have a solids content of from 30 to 75% by weight, preferably from 50 to 60% by weight. To prepare the water-redispersible polymer powders, the aqueous dispersions are dried, for example by fluidized-bed drying, freeze drying, or spray drying, where appropriate after addition of protective colloids as a spraying aid. The dispersions are preferably spray dried. Spray drying may utilize conventional spray drying processes, and atomization may take place by way of single-, twin- or multifluid nozzles, or by using a rotating disc. The discharge temperature selected is generally in the range from 45° C. to 120° C., preferably from 60° C. to 90° C., depending on the plant, the Tg of the resin, and the desired degree of drying.

The total amount of the spraying aid used is generally from 3 to 30% by weight, based on the polymeric constituents of the dispersion. This means that the total amount of protective colloid prior to the drying procedure should be at least from 3 to 30% by weight, based on the polymer content, preferably from 5 to 20% by weight, based on the polymer content.

Suitable spraying aids are partially hydrolyzed polyvinyl alcohols; polyvinylpyrrolidones; polysaccharides in water-soluble form, such as starches (amylose and amylopectin), celluloses and their carboxymethyl, methyl, hydroxyethyl, and hydroxypropyl derivatives; proteins, such as casein or caseinate, soy protein, gelatin; ligninsulfonates; synthetic polymers, such as poly(meth)acrylic acid, copolymers of (meth)acrylates with carboxyl-functionality comonomer units, poly(meth)acrylamide, polyvinylsulfonic acids, and water-soluble copolymers of these; melamine-formaldehydesulfonates, naphthalene-formaldehydesulfonates, styrene-maleic acid copolymers, and vinyl ether-maleic acid copolymers. It is preferable not to use protective colloids other than polyvinyl alcohols as spraying aid.

A content of up to 1.5% by weight of antifoam, based on the base polymer, has frequently proven advantageous during spraying. In order to improve blocking resistance and thus improve storage stability, particular for powders with a low glass transition temperature, the powder obtained may be provided with an antiblocking agent (anticaking agent), preferably at up to 30% by weight, based on the total weight of polymeric constituents. Examples of antiblocking agents are calcium carbonate, magnesium carbonate, talc, gypsum, silica, kaolins, and silicates, preferably with particle sizes in the range from 10 nm to 10 µm.

The manner in which the viscosity of the product to be sprayed is set, by way of the solids content, is such as to give a value of less than 500 mPa.s (Brookfield viscosity at 20 rpm and 23° C.), preferably less than 250 mPa.s. The solids content of the dispersion to be sprayed is preferably greater than 35%, more preferably greater than 40%.

Other additives may be used during the spraying process in order to improve product performance. Examples of other constituents of dispersion powder compositions, present in some embodiments, are pigments, fillers, foam stabilizers, and hydrophobicizing agents.

The aqueous polymer dispersions, and the water-redispersible, protective-colloid-stabilized polymer powders prepared therefrom, may be used in the application sectors typical for these materials, for example in chemical formulations for the construction industry, for example in combination with hydraulically setting binders such as cements i.e., Portland, alumina, pozzolanic, slag, magnesia, or phosphate cements; in plaster of Paris; in water glass; for producing construction adhesives, in particular tile adhesives or exterior insulation system adhesives; for plasters or renders; troweling compositions; floor-filling compositions; flowable compositions; sealing slurries; jointing mortars; paints; binders for coating compositions or adhesives; or as a composition for the coating or binding of textiles or paper.

The use of the final product itself as a seed latex brings further advantages in addition to those mentioned above: there is no need to prepare, store, and provide a separate seed dispersion (lines, pumps, etc.). No constituents foreign to the desired product specification are then carried over into the product. There are no additional logistics problems, since the desired amount of the seed may preferably be reintroduced directly from the final unpressurized reactor by way of a small pump into the first pressurized reactor. The net production rate is not constrained by provision of a seed from outside sources.

The examples below provide further illustration of the invention.

EXAMPLE 1

4.0 kg of an aqueous dispersion of a vinyl acetate-ethylene copolymer composed of 83% by weight of vinyl acetate and 17% by weight of ethylene, stabilized with 7% by weight, based on the copolymer weight, of a polyvinyl alcohol with a degree of hydrolysis of 88 mol % and with a Höppler viscosity of 4 mPa.s, formed an initial charge in a 5 liter pressurized reactor R1. 500 g of vinyl acetate and 200 g of a 20% strength aqueous solution of a polyvinyl alcohol with a degree of hydrolysis of 88 mol % and with a Höppler viscosity of 4 mPa.s also formed an initial charge. This reactor R1 feeds into a second pressurized reactor R2 of identical size, likewise charged with the dispersion. Both reactors were supplied with ethylene, the pressure in the first reactor being 70 bar and that in the second reactor being 35 bar. The driving force for mass flow was therefore the pressure difference between the two reactors. The amount of the dispersion removed from the second pressurized reactor by way of a pump was equal to the amount of the streams of material introduced within the two reactors.

Both reactors were heated to 65° C., at which point the metering of the initiator, potassium persulfate (3% by weight solution in water) and Bruggolite (1.5% by weight solution in water) was begun, each at 25 ml/h in reactor R1, and each at 60 ml/h in reactor R2. At the start of the reaction, observable as a rise in temperature, the other feeds into reactor R1 were begun: vinyl acetate at 1000 g/h, polyvinyl alcohol at 1200 g/h, and dispersion at 30 g/h. Ethylene was supplemented at a rate of 320 g/h at 70 bar in reactor R1.

The finished dispersion was conveyed by a pump from the pressurized reactor R2 into an unpressurized reactor R3, where its polymerization continued using 20 ml of tert-butyl hydroperoxide as a 10% by weight solution in water, and 20 ml of Bruggolite, as 10% strength by weight solution in water, per 10 kg of dispersion.

The polymerization time was 20 hours, yielding a dispersion with solids content of 50.3%, a viscosity of 150 mPa.s (Brookfield 20 at 23° C.), a pH of 4.1, and a particle size diameter Dw of 1130 nm. The particle size distribution was stable over the duration of the experiment. No formation of wall deposit was observed.

The screen residue, screening above 250 µm, was 350 ppm (mg/kg). The K value was 105. Residual free monomer was less than 300 ppm. The dispersion was stable in cement.

EXAMPLE 2

The method of polymerization was the same as in Example 1, except that the reduction component Bruggolite was added only in reactor R1, at a rate of 80 g/h.

This gave a dispersion with solids content of 50.0%, a viscosity of 140 mPa.s (Brookfield 20 at 23° C.), a pH of 4.1, and a particle size diameter Dw of 1050 nm. The particle size distribution was stable over the duration of the experiment. No formation of wall deposit was observed. The screen residue, screening above 250 µm, was 150 ppm. Residual free monomer was less than 500 ppm. The dispersion was stable in cement.

EXAMPLE 3

The method of polymerization was the same as in Example 1, except that the dispersion was metered into reactor R1 at only half the rate, namely at 15 g/h, yielding a dispersion with solids content of 50.6%, a viscosity of 135 mPa.s (Brookfield 20 at 23° C.), a pH of 4.0, and a particle size diameter Dw of 1130 nm. The particle size distribution was stable over the duration of the experiment. No formation of wall deposit was observed.

The screen residue, screening above 250 µm, was 280 ppm. Residual free monomer was less than 500 ppm. The dispersion was stable in cement.

EXAMPLE 4

The method of polymerization was the same as in Example 1. Metering of seed was dispensed with after a running time of 15 hours. Polymerization was carried out without addition of seed for the next 20 hours. The product was a dispersion with solids content of 50.3%, a viscosity of 165 mPa.s (Brookfield 20 at 23° C.), a pH of 4.2, and a particle size diameter Dw of 1250 nm. The particle size distribution was stable over the duration of the experiment. No formation of wall deposit was observed.

The screen residue, screening above 250 µm, was 150 ppm. Free residual monomer was less than 500 ppm. The dispersion was stable in cement.

EXAMPLE 5

The method of polymerization was the same as in Example 1, except that no dispersion was metered into reactor R1 as seed latex, yielding a dispersion with solids content of 50.8%, a viscosity of 180 mPa.s (Brookfield 20 at 23° C.), and a pH of 4.1. The particle size distribution oscillated between two conditions: monomodal of about 1500 nm and bimodal at about 400 nm/2200 nm.

The screen residue, screening above 250 μm, was 350 ppm (mg/kg). The K value was 105. Free residual monomer was less than 300 ppm. The dispersion was stable in cement.

Comparative Example 6

The method of polymerization was the same as in Example 1, except that the seed latex metered into reactor R1 was not the polymerization product but a fine-particle (300 nm), emulsifier-stabilized vinyl acetate-ethylene dispersion. The product was a dispersion with solids content of 50.2%, a viscosity of 110 mPa.s (Brookfield 20 at 23° C.), a pH of 4.2, and with a particle size diameter Dw of 950 nm. The particle size distribution was stable over the duration of the experiment. No formation of wall deposit was observed.

The screen residue, screening above 250 μm, was 220 ppm (mg/kg). The K value was 105. Free residual monomer was less than 300 ppm. However, the dispersion was unstable in cement.

Comparative Example 7

For purposes of comparison, a dispersion with an identical makeup to the dispersion of claim 1, but prepared in a batch process, was used. The dispersion was composed of a vinyl acetate-ethylene copolymer having 83% by weight of vinyl acetate and 17% by weight of ethylene, and had been stabilized with 7% by weight, based on the copolymer, of a polyvinyl alcohol with a degree of hydrolysis of 88 mol % and with a Höppler viscosity of 4 mPa.s. This dispersion was also used as the seed dispersion in Examples 1 to 4.

Powder Preparation

The dispersions from Examples 1 to 4 and from Comparative Examples 5 to 7 were treated with 5% by weight (solids/solids) of polyvinyl alcohol with a degree of hydrolysis of 88 mol % and with a Höppler viscosity of 4 mPa.s, and diluted with water to a spraying viscosity of 250 mPa.s. The dispersion was then sprayed by means of a twin-fluid nozzle. Air compressed to 4 bar served as the spraying medium, and the droplets formed were dried using cocurrent air heated to 125° C. The resultant dry powder was treated with 10% by weight of commercially available antiblocking agent, a mixture of calcium magnesium carbonate and magnesium hydrosilicate.

Redispersion Performance of Polymer Films

The dispersions of the previous examples prior to spray drying, were used to prepare films of 0.2 mm thickness on glass slides, and these were dried for 15 minutes at 105° C. To check film redispersibility, a pipette was used to apply one water droplet at room temperature to a homogeneous region of each film to be tested. After this region had been exposed to the water droplet for 60 seconds it was rubbed with the end of a finger until the film had been removed from this region of the glass slide, or the film broke up into pieces, or remained intact.

The Redispersibility of the Polymer Films Was Assessed Using the Following Evaluation Scale Grade 1: Light rubbing immediately redisperses the film, or it redisperses spontaneously;

Grade 2: Rubbing redisperses the film, but some film fragments may be difficult to disperse;

Grade 3: Vigorous rubbing required to redisperse the film, with formation of film fragments;

Grade 4: Even after prolonged vigorous rubbing, the film does not redisperse, but fragments.

Determination of Sedimentation Performance of Powders (Tube Sedimentation)

To determine sedimentation performance, 50 g of each dispersion powder were redispersed in 50 ml of water, then diluted to 0.5% solids content, and the height of settled solids is measured for 100 ml of this redispersion poured into a graduated tube, sedimented solids being measured after 1 hour.

Determination of Blocking Resistance

To determine blocking resistance, the dispersion powder was placed in an iron pipe with a thread, and then subjected to a load from a metal ram. The application of the load was followed by storage for 16 hours at 50° C. in a drying cabinet. After cooling to room temperature, the powder was removed from the tube and resistance to blocking was determined qualitatively by crushing the powder. Resistance to blocking was classified as follows:

1=Very good blocking resistance
2=Good blocking resistance
3=Satisfactory blocking resistance
4=Not resistant to blocking—powder after crushing no longer free-flowing.

Determination of Cement Stability

A cement mix was prepared with the following formulation:

| | |
|---|---|
| Portland cement | 82.5 g |
| Calcite (CaCO$_3$ 10–40 nm) | 75 g |
| Quartz sand (200–500 nm) | 142 g |
| Dispersion powder | 14.5 g |
| Water | 85 g |

The workability of the cement mixed was observed over a period of 2 hours and evaluated qualitatively.

Table 1 gives the test results.

TABLE 1

| Ex. | Redispersibility | Tube sediment [cm] | Blocking resistance | Cement stability |
|---|---|---|---|---|
| Ex. 1 | 1 | 1.5 | 1 | Stable |
| Ex. 2 | 1 | 2.0 | 1 | Stable |
| Ex. 3 | 1 | 1.0 | 1 | Stable |
| Ex. 4 | 1 | 1.5 | 1 | Stable |
| Ex. 5 | 1 | 2.5 | 1–2 | Stable |
| Comp. Ex. 6 | 2 | 3.5 | 1–2 | Unstable |
| Comp. Ex. 7 | 1 | 1.0 | 1 | Stable |

Using the procedure of the invention it was possible to achieve products whose powders had comparable blocking resistance, and therefore storage stability, to that of vinyl acetate-ethylene powders prepared by a standard batch process. The redispersibility and cement stability are comparable.

Tensile bond strengths of tile adhesives were tested on the following formulation (6% by weight powder content):

| | |
|---|---|
| Quartz sand | 586 parts |
| Portland cement | 350 parts |
| Cellulose | 4 parts |
| Dispersion powder | 60 parts |

The tensile bond strengths were determined under 4 conditions of storage:

| | |
|---|---|
| 28D: | 28 days of dry storage |
| 7D/21W: | 7 days of dry storage/21 days of wet storage |
| 14D/14DC + 70° C./1D: | Hot storage |
| Frost/thaw: | Storage in frost/thaw conditions |

The results are given in Table 2.

TABLE 2

| Ex. | EB % | UTS N/mm$^2$ | 28D N/mm$^2$ | 7D/ 21W N/mm$^2$ | 14D/14DC + 70/1D N/mm$^2$ | Frost/ thaw N/mm$^2$ |
|---|---|---|---|---|---|---|
| Ex. 1 | 751 | 6.2 | 1.65 | 0.91 | 1.44 | 0.88 |
| Ex. 2 | 885 | 7.3 | 1.43 | 0.92 | 1.28 | 0.86 |
| Ex. 3 | 722 | 6.4 | 1.56 | 0.88 | 1.33 | 0.89 |
| Ex. 4 | 663 | 6.8 | 1.45 | 0.92 | 1.42 | 0.94 |
| Ex. 5 | 625 | 6.5 | 1.35 | 0.85 | 1.38 | 0.87 |
| Comp. Ex. 6 | 640 | 6.0 | 1.32 | 0.67 | 1.22 | 0.65 |
| Comp. Ex. 7 | 720 | 6.5 | 1.54 | 0.97 | 1.32 | 0.85 |

Discussion of Results From Table 2

Compared with the powder from Comparative Example 7 (batch process), the powders of the invention exhibit a comparable property profile over all conditions of storage. The powder from Comparative Example 6 (emulsifier-stabilized dispersion as seed latex) is weak under wet storage conditions and under frost/thaw conditions of storage (properties affected by the emulsifier).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for preparing protective colloid-stabilized polymers based on esters and ethylene and optionally other comonomers as polymerizable monomers, in the form of aqueous polymer dispersions or water-redispersible polymer powders, by means of free-radical-initiated continuous emulsion polymerization to form an aqueous polymer dispersion and, for polymer powders, drying the resultant polymer dispersion, comprising
   emulsion polymerizing said polymerizable monomers in at least two pressurized reactors arranged in series at a temperature of from 40° C. to 100° C. and at a pressure of from 5 bar to 100 bar, the pressure of said first reactor higher than the pressure of said second reactor, to a residual monomer content of less than 3% by weight, and further polymerizing in at least one unpressurized reactor at a temperature of from 20 to 60° C. and at a pressure of <1 bar, wherein
   the polymerization is initiated using a redox system made from an oxidizing component and a reducing component, and where at least a portion of the total reducing component is introduced into the first pressurized reactor.

2. The process of claim 1, wherein the materials introduced into the first pressurized reactor comprise, in addition to the other starting material streams, a seed latex whose particle size Dw corresponds substantially to that of the final product.

3. The process of claim 2, wherein the seed latex is a polyvinyl-alcohol-stabilized vinyl ester-ethylene dispersion.

4. The process of claim 3, wherein the seed latex corresponds to the final product of the polymerization with respect to copolymer makeup, the nature and the amount of a protective colloid, and the particle size and solids content.

5. The process as claimed in any of claim 2, wherein the amount of seed latex is from 0.1 to 8.0% by weight (solids/solids), based on the amount of vinyl ester monomer.

6. The process of claim 2, wherein the feed of the seed latex is dispensed with once the running time of the polymerization is greater than from 15 to 20 hours.

7. The process of claim 1, wherein all of the reducing component is introduced into the first pressurized reactor.

8. The process of claim 1, wherein the polymerization is carried out in two pressurized reactors arranged in series and then in one or two unpressurized reactor(s).

9. The process of claim 1, wherein from 30 to 90% by weight of one or more vinyl esters of carboxylic acids having from 1 to 12 carbon atoms, and from 1 to 40% by weight of ethylene, in each case based on the total weight of the monomers, are copolymerized, optionally with one or more other comonomers selected from the group consisting of esters of acrylic acid, esters or methacrylic acid, vinyl halides, and olefins.

10. The process of claim 1, wherein the materials copolymerized are
   comonomer mixtures of vinyl acetate with from 1 to 40% by weight of ethylene;
   comonomer mixtures of vinyl acetate with from 1 to 40% by weight of ethylene, and with from 1 to 50% by weight of one or more other comonomers selected from the group consisting of vinyl esters having from 1 to 12 carbon atoms in the carboxylic acid residue;
   mixtures of vinyl acetate, from 1 to 40% by weight of ethylene, and from 1 to 60% by weight of acrylic esters of unbranched or of branched alcohols having from 1 to 15 carbon atoms;
   mixtures with from 30 to 75% by weight of vinyl acetate, from 1 to 30% by weight of vinyl laurate or vinyl esters of an alpha-branched carboxylic acid having from 9 to 11 carbon atoms, and from 1 to 30% by weight of acrylic esters of unbranched or branched alcohols having from 1 to 15 carbon atoms, and 1 to 40% by weight of ethylene; or
   mixtures of vinyl acetate, from 1 to 40% by weight of ethylene, and from 1 to 60% by weight of vinyl chloride;
   wherein the above mixtures optionally further comprise auxiliary monomers, and wherein the %s by weight total 100%.

11. The process of claim 1, wherein the protective colloid used comprises one or more partially hydrolyzed polyvinyl alcohols with a degree of hydrolysis of from 80 to 95 mol % and with a Höppler viscosity of from 1 to 30 mPa.s measured in 4% strength aqueous solution.

12. The process of claim 1, wherein the amount of ethylene supplied to the pressurized reactors is such that the polymerization is carried out at a pressure of from 30 to 80 bar in the first pressurized reactor and at a pressure of from 10 to 40 bar in the final pressurized reactor, and the ethylene pressure in the respective pressurized reactors is such as to give a falling pressure gradient from the first to the final reactor of the pressurized reactors arranged in series.

13. The process of claim 1, wherein, based on the total weight of copolymerizable monomers, from 50 to 100% by weight of the vinyl ester monomers and any other non-ethylene comonomers are metered into the first pressurized reactor, and the remainder is metered in within subsequent pressurized reactors, and wherein the initial charge in the first pressurized reactor comprises at least 50% by weight of the total ethylene added.

14. The process of claim 1, wherein at least 70% by weight of the protective colloid is part of the initial charge in the first pressurized reactor.

15. The process of claim 1, wherein the metering of the initiators is such that the polymerization in the first pressurized reactor proceeds to a residual monomer content of from 10 to 20% by weight; and the polymerization in the final pressurized reactor proceeds to a residual monomer content of <3% by weight, based in each case on the total weight of the batch.

16. The process of claim 1, wherein the average residence time in the pressurized reactors in the polymerization are from 60 to 180 minutes.

17. The process of claim 1, wherein the resultant aqueous dispersion is dried by spray drying, optionally after addition of further protective colloid as a spraying aid.

18. A mixing specification, comprising at least one protective colloid-stabilized polymer prepared by the process of claim 1, optionally in combination with inorganic, hydraulically setting binders, wherein said mixing specification is one for a construction adhesive, plaster or render a troweling composition, floor-filling composition, flowable composition, sealing slurry, jointing mortar, or a paint.

19. A coating composition or adhesive comprising, as at least one constituent thereof, a protective colloid-stabilized polymer prepared by the process of claim 1.

20. A coating or binder composition suitable for the coating or binding of paper or textile products, comprising, as at least one constituent, the protective colloid-stabilized polymer prepared by the process of claim 1.

* * * * *

UNITED STATES PATENT AND TRADEMARK OFFICE
CERTIFICATE OF CORRECTION

PATENT NO. : 6,664,322 B2
DATED : December 16, 2003
INVENTOR(S) : Hans-Peter Weitzel It is certified that error appears in the above-identified patent and that said Letters Patent is hereby corrected as shown below:

Column 13,
Line 40, after "on" insert -- vinyl --.

Signed and Sealed this

Twenty-seventh Day of April, 2004

JON W. DUDAS
*Acting Director of the United States Patent and Trademark Office*

UNITED STATES PATENT AND TRADEMARK OFFICE
Certificate

Patent No. 6,664,322 B2                    Patented: December 16, 2003

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Hans-Peter Weitzel, Reischach (DE); and Robert Braunsperger, Burghausen (DE).

Signed and Sealed this Fourth Day of September 2007.

DAVID W. WU
*Supervisory Patent Examiner*
Art Unit 1713